(12) United States Patent
Leko et al.

(10) Patent No.: US 9,933,020 B2
(45) Date of Patent: Apr. 3, 2018

(54) PROPSHAFT ASSEMBLY HAVING YOKE FRICTION WELDED TO PROPSHAFT TUBE

(71) Applicant: American Axle & Manufacturing, Inc., Detroit, MI (US)

(72) Inventors: Michael J. Leko, Traverse City, MI (US); Lance M. Kujawski, Clinton Township, MI (US)

(73) Assignee: AMERICAN AXLE & MANUFACTURING, INC., Detroit, MI (US)

( * ) Notice: Subject to any disclaimer, the term of this patent is extended or adjusted under 35 U.S.C. 154(b) by 100 days.

(21) Appl. No.: 15/159,119

(22) Filed: May 19, 2016

(65) Prior Publication Data

US 2016/0341254 A1 Nov. 24, 2016

Related U.S. Application Data

(60) Provisional application No. 62/165,387, filed on May 22, 2015.

(51) Int. Cl.
*B23K 20/12* (2006.01)
*F16D 3/38* (2006.01)
(Continued)

(52) U.S. Cl.
CPC ............ *F16D 3/387* (2013.01); *B23K 20/129* (2013.01); *F16C 3/023* (2013.01); *B23K 2201/005* (2013.01)

(58) Field of Classification Search
None
See application file for complete search history.

(56) References Cited

U.S. PATENT DOCUMENTS

| 2,952,999 | A | | 9/1960 | Glover | |
|---|---|---|---|---|---|
| 3,269,002 | A | * | 8/1966 | Hollander | .............. B23K 20/12 228/113 |

(Continued)

FOREIGN PATENT DOCUMENTS

JP 2014-161881 A 9/2014

OTHER PUBLICATIONS

Chapter 10; Assembly Techniques; Category II; Welding, Adhesive Bonding.

(Continued)

*Primary Examiner* — Devang R Patel
(74) *Attorney, Agent, or Firm* — Harness, Dickey & Pierce, P.L.C.

(57) ABSTRACT

A method for forming a propshaft assembly includes: providing a tube having an annular wall member and an axial end face; providing a yoke having body and a pair of arms that extend from the body, the body defining an annular groove having sidewalls and an end face, the sidewalls being spaced apart to receive the annular wall member; spinning at least one of the tube and the yoke while engaging the axial end face to the end face of the annular groove to plasticize a portion of the yoke and a portion of the tube; and driving the yoke and the tube together to fuse the plasticized portion of the yoke and the plasticized portion of the tube together and thereby form a friction weld; wherein the tube is fused to the yoke over portions of the yoke that correspond to the sidewalls and the end face.

14 Claims, 4 Drawing Sheets

(51) Int. Cl.
*F16C 3/02* (2006.01)
*B23K 101/00* (2006.01)

(56) References Cited

U.S. PATENT DOCUMENTS

| | | | |
|---|---|---|---|
| 3,618,196 | A | 11/1971 | Sluetz |
| 4,663,819 | A | 5/1987 | Traylor |
| 5,154,340 | A | 10/1992 | Peacock |
| 5,672,286 | A | 9/1997 | Seeds |
| 6,105,849 | A | 8/2000 | Mochizuki et al. |
| 6,199,916 | B1 * | 3/2001 | Klinger ............... B29C 65/0672 156/73.5 |
| 6,817,511 | B2 * | 11/2004 | Durand ................... B60B 35/16 228/115 |
| 7,168,608 | B2 | 1/2007 | Mei |
| 2006/0121994 | A1 | 6/2006 | Douglass et al. |
| 2006/0131300 | A1 * | 6/2006 | Yablochnikov ...... B23K 13/015 219/617 |
| 2008/0023527 | A1 * | 1/2008 | Brenninger ............ B23K 20/06 228/101 |
| 2011/0300954 | A1 * | 12/2011 | Szuba ..................... F16D 3/387 464/106 |
| 2014/0302961 | A1 * | 10/2014 | Downs ................... F16H 48/08 475/230 |
| 2014/0339888 | A1 * | 11/2014 | Downs ................... B60B 35/18 301/137 |
| 2015/0345540 | A1 * | 12/2015 | Kim ....................... F16C 3/023 464/181 |

OTHER PUBLICATIONS

International Search Report and Written Opinion of the International Searching Authority regarding International Application No. PCT/US2016/033504, dated Sep. 1, 2016.

* cited by examiner

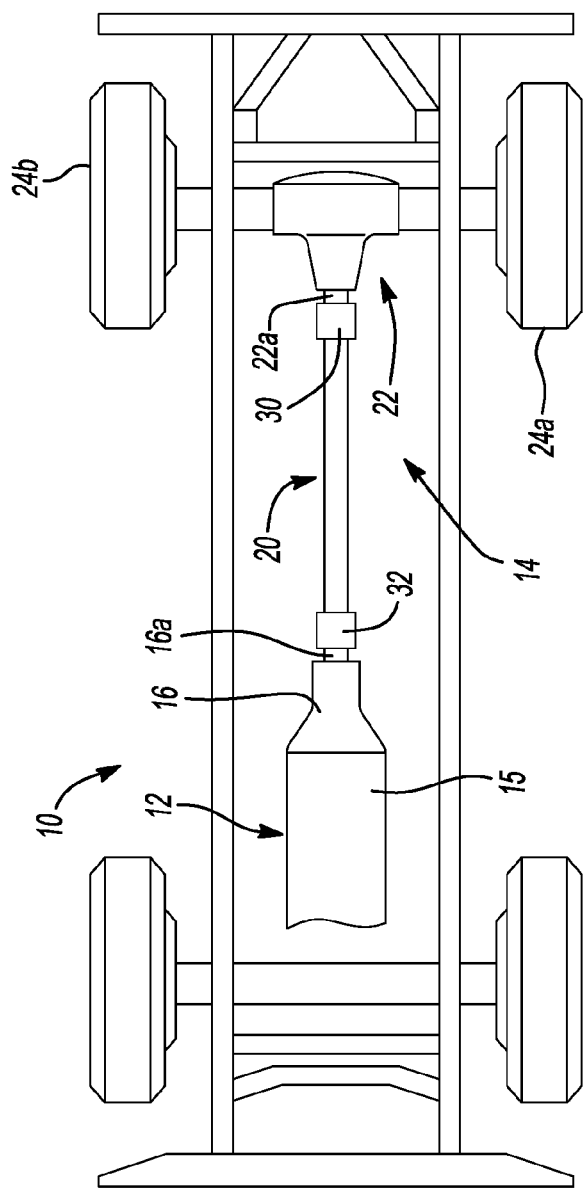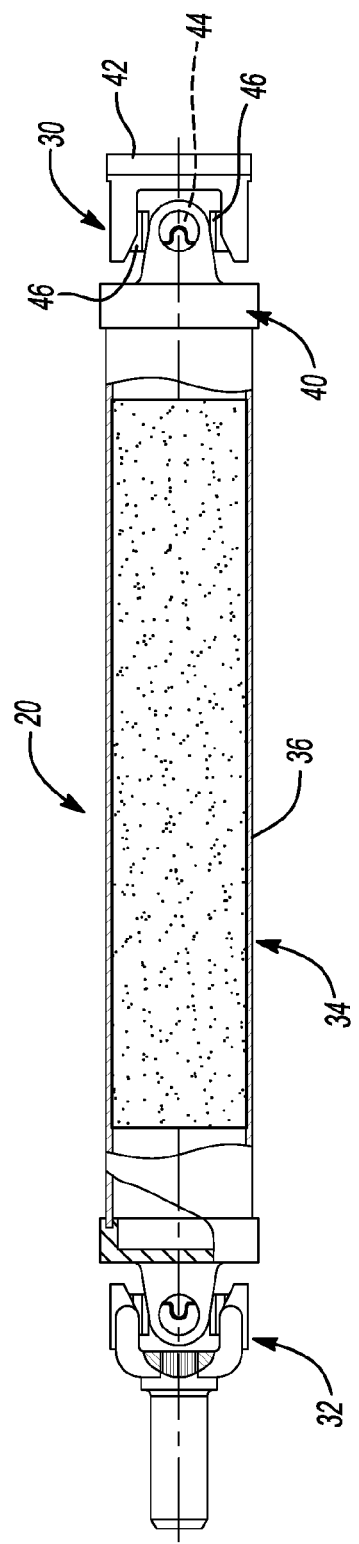

PROPSHAFT ASSEMBLY HAVING YOKE FRICTION WELDED TO PROPSHAFT TUBE

CROSS-REFERENCE TO RELATED APPLICATIONS

This application claims the benefit of U.S. Provisional Patent Application No. 62/165,387 filed May 22, 2015, the disclosure of which is incorporated by reference as if fully set forth in detail herein.

FIELD

The present disclosure relates to a propshaft assembly having a yoke that is friction welded to a propshaft tube.

BACKGROUND

This section provides background information related to the present disclosure which is not necessarily prior art.

Propshaft assemblies for cars and trucks typically are employed to transmit rotary power from an input device, such as a transmission or a transfer case, to an output device, such as an axle assembly. Commercial propshaft assemblies typically comprise a propshaft tube that is welded on one or more ends to a weld yoke. A common welding process for coupling the weld yoke(s) to the propshaft tube is friction welding. We have noted that it can be challenging to achieve sufficient weld strength when using relatively thin-walled tubing for the propshaft tube.

SUMMARY

This section provides a general summary of the disclosure, and is not a comprehensive disclosure of its full scope or all of its features.

In one form, the present disclosure provides a method for forming a propshaft assembly. The method includes: providing a propshaft tube having an annular wall member and an axial end face; providing a weld yoke having yoke body and a pair of yoke arms that extend from the yoke body, the yoke body defining an annular groove having side walls and an end face, the side walls being spaced apart to receive the annular wall member; spinning at least one of the propshaft tube and the weld yoke while engaging the axial end face to the end face of the annular groove to plasticize a portion of the weld yoke and a portion of the propshaft tube; and driving the weld yoke and the propshaft tube together to fuse the plasticized portion of the weld yoke and the plasticized portion of the propshaft tube together and thereby form a friction weld; wherein the propshaft tube is fused to the weld yoke over portions of the weld yoke that correspond to the side walls and the end face.

In one form, prior to driving the weld yoke and the propshaft tube together, a weld length control member is positioned around a portion of the propshaft tube and a portion of the yoke body in a location where the friction weld is to be formed and wherein the weld length control member is configured to limit migration of plasticized material from the plasticized portion of the propshaft tube in a radially outward direction. Optionally, the weld length control member can be part of the weld yoke or can be a tool that is independent of the propshaft assembly.

In another form, the present disclosure provides a propshaft assembly that includes a propshaft tube and a weld yoke. The propshaft tube has a wall member. The weld yoke has a yoke body with an annular outer surface and an annular inner surface. The propshaft tube is welded to the yoke body such that a portion of the propshaft tube is disposed radially between the annular outer and inner surfaces and embedded into an axial end of the yoke body.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a schematic illustration of a propshaft assembly constructed in accordance with the teachings of the present disclosure, the propshaft assembly being illustrated in a drivetrain of an exemplary vehicle;

FIG. 2 is a partly sectioned side elevation view of the propshaft assembly of FIG. 1;

Corresponding reference numerals indicate corresponding parts throughout the several views of the drawings.

DETAILED DESCRIPTION

Figure 3:
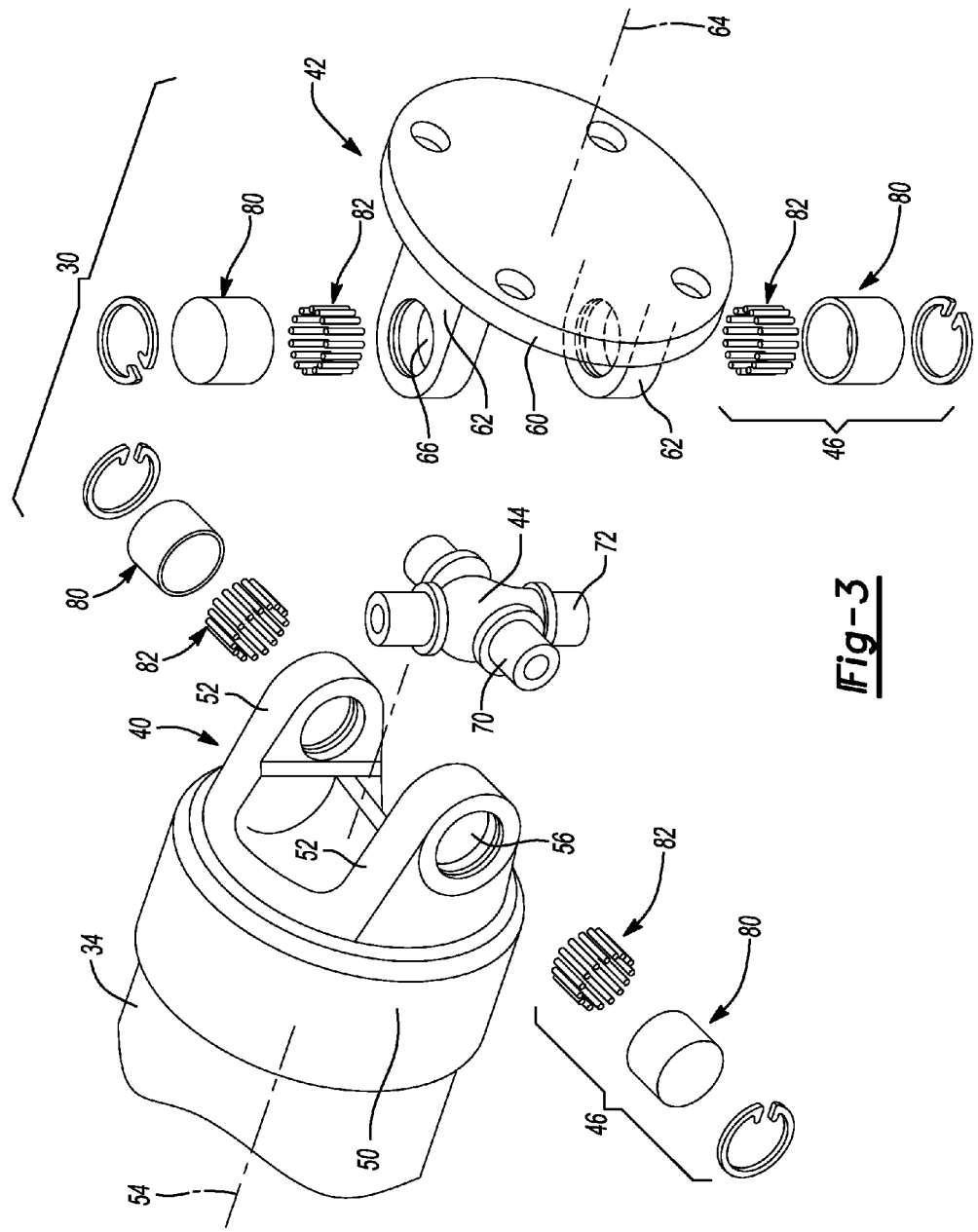
FIG. 3 is an exploded perspective view of a portion of the propshaft assembly of FIG. 1.

With reference to FIG. 1, a vehicle having a propshaft constructed in accordance with the teachings of the present disclosure is schematically illustrated. The vehicle 10 includes a power train 12 and a drivetrain 14. The power train 12 can include a power source, such as an internal combustion engine 15, and a transmission 16 that can cooperate to provide rotary power to the drivetrain 14. The drivetrain 14 can include a propshaft assembly 20 and an axle assembly 22 that cooperate to transmit rotary power to a pair of drive wheels 24a, 24b. The powertrain 12 and the axle assembly 22 can be conventional in their construction and operation and as such, a detailed discussion of these components need not be provided herein. The propshaft assembly 20 is configured to transmit rotary power between an output shaft 16a of the transmission 16 and an input pinion shaft 22a of the axle assembly 22.

With reference to FIG. 2, the propshaft assembly 20 can include a first universal joint 30, a second universal joint 32 and a propshaft tube 34. The propshaft tube 34 can be formed of a desired material, such as 6XXX or 5XXX aluminum alloys (e.g., 5454, 6061-T6) or steel. The propshaft tube 34 can be a seamless tubular structure (e.g., extrusion) or could be a welded tubular structure and can define an annular wall member 36.

With reference to FIGS. 2 and 3, the first and second universal joints 30 and 32 are generally similar and as such a discussion of the first universal joint 30 will suffice for both. The first universal joint 30 can have a first yoke 40, a second yoke 42, a cross-shaft 44 and a plurality of bearing assemblies 46. The first yoke 40 can have a first yoke body 50 and a pair of first yoke arms 52 that extend from the first yoke body 50. The first yoke body 50 is configured to be fixedly coupled to the first tubular member 34 with via friction welding as will be discussed in greater detail below. The first yoke arms 52 are spaced 180 degrees apart from one another around a rotational axis 54 of the first yoke 40. Each of the first yoke arms 52 defines a bore 56 that is configured to receive an associated one of the bearings assemblies 46 therein.

The second yoke 42 can have a second yoke body 60 and a pair of second yoke arms 62 that extend from the second yoke body 60. The second yoke body 60 is configured to be axially and non-rotatably coupled to the input pinion shaft 22a (FIG. 1) in a desired manner, such as with a plurality of bolts (not shown). Alternatively, the second yoke body 60 could be configured as a slip yoke that could be configured to be non-rotatably but axially slidably coupled to a power transmitting element, for example in the manner shown for the second universal joint 32. The second yoke arms 62 are spaced 180 degrees apart from one another around a rotational axis 64 of the second yoke 42. Each of the second yoke arms 62 defines a bore 66 that is configured to receive an associated one of the bearing assemblies 46 therein.

The cross-shaft 44 defines a pair of first trunnions 70, which are received into the bores 56 in the first yoke arms 52, and a pair of second trunnions 72 that are received into the bores 66 of the second yoke arms 62. Each of the bearing assemblies 46 comprises a bearing cup 80, which is engaged to a corresponding one of the first and second yoke arms 52 and 62, and a plurality of rollers 82 that are disposed between the bearing cup 80 and a corresponding one of the first and second trunnions 70 and 72. Accordingly, it will be appreciated that each of the first trunnions 70 is pivotally mounted to a corresponding one of the first yoke arms 52 and that each of the second trunnions 72 is pivotally mounted to a corresponding one of the second yoke arms 62.

Figure 4:
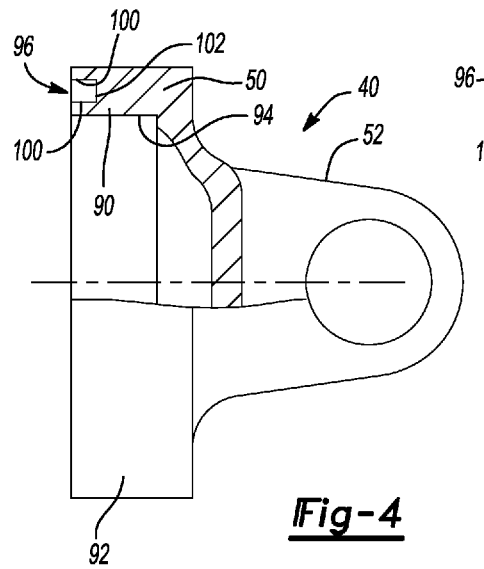
FIG. 4 is a partly sectioned side elevation view of a portion of the propshaft assembly of FIG. 1 illustrating a first yoke in more detail.
Figure 5:
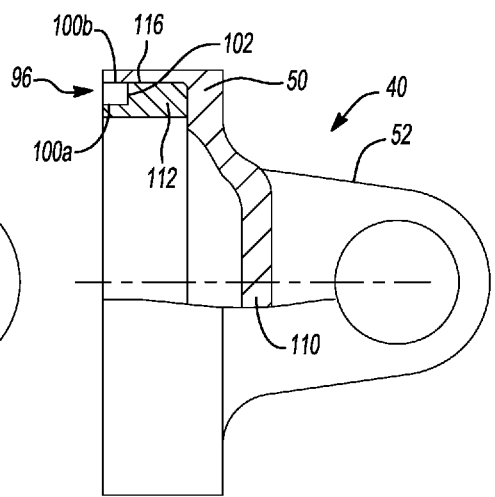
FIG. 5 is a view similar to that of FIG. 4 but illustrating an alternately constructed first yoke.

With reference to FIG. 4, the first yoke 40 can be unitarily formed from a suitable material that is friction weld-compatible with the material from which the propshaft tube 34 (FIG. 2) is formed, such as 6061-T6 aluminum. The first yoke body 50 can have an annular wall 90 that can define an outer circumferential surface 92, an inner circumferential surface 94 and an annular groove 96 that is disposed between the outer and inner circumferential surfaces 92 and 94. The annular groove 96 can have a pair of sidewalls 100 and an end face 102. Alternatively, the first yoke 40 could be an assembly that can include a first yoke portion 110 and a second yoke portion 102. The first yoke portion 110 can define a bore 116 into which the second yoke portion 112 is fitted. The second yoke portion 112 can be fixedly coupled to the first yoke portion 110 by any desired means, such as welding. The second yoke portion 112 can at least partly define the annular groove 96. In the particular example provided, the second yoke portion 112 defines a first one of the sidewalls 100a and the end face 102, while the inside surface of the bore 116 in the first yoke portion 110 can define the remaining sidewall 100b.

Figure 6:
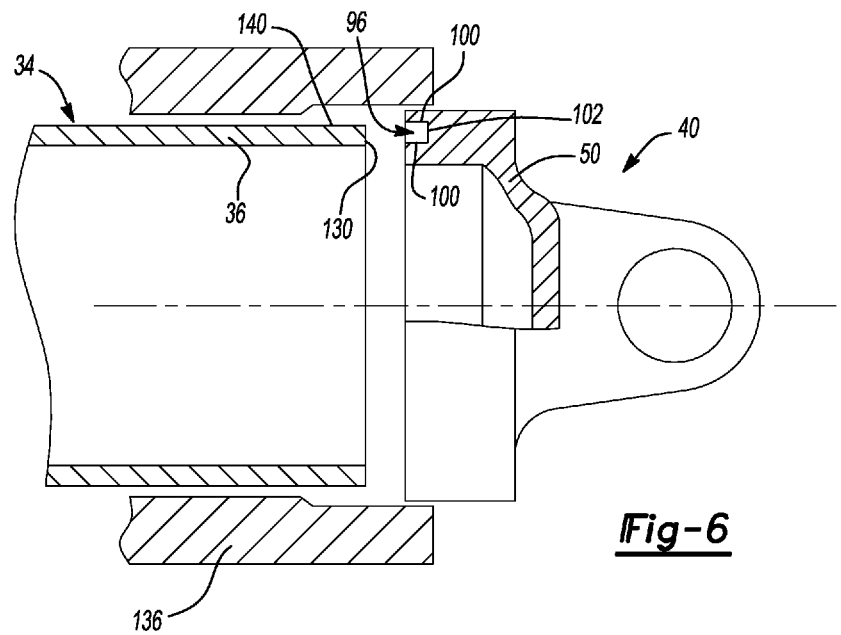
FIG. 6 is a partly sectioned side elevation view depicting the locating of the first yoke relative to a propshaft tube and a tool prior to the formation of a friction weld that secures the first yoke to the propshaft tube as part of the process for manufacturing the propshaft assembly of FIG. 1.

With reference to FIG. 6, the annular groove 96 can be sized to receive or partly receive the annular wall member 36 of the propshaft tube 34. In the particular example provided the annular groove 96 has a width (between the sidewalls 100) of about 0.050 inch (1.27 mm) and the annular wall member 36 has a thickness of about 0.075 inch (1.90 mm) to 0.120 inch (3.05 mm) so that there is an interference of about 0.025 inch (0.64 mm) to 0.070 inch (1.78 mm) between the propshaft tube 34 and the first yoke body 50. It will be appreciated, however, that the sidewalls 100 could be spaced apart by a distance that is sufficient to wholly admit the wall thickness of the propshaft tube 34. The annular groove 96 can have a desired depth, such as a depth of about 0.160 inch (4.0 mm). In practice, we have found that the wall thickness of the portion of the first yoke body 50 that is disposed between the outer circumferential surface of the first yoke body 50 and the outer one of the sidewalls 100 can be thicker than the wall thickness of the annular wall member 36 by a desired amount, such as by about twenty percent (20%). At least one of the propshaft tube 34 and the first yoke 40 can be spun while an axial face 130 of the annular wall member 36 is abutted to the end face 102 of the annular groove 96. Frictional contact between the axial end face 130 and the end face 102 of the annular groove 96 can generate heat that can plasticize a portion of the first yoke body 50 and a portion of the propshaft tube 34. The first yoke 40 and the propshaft tube 34 can be driven together to fuse the first yoke 40 and the propshaft tube 34 together.

Figure 7:
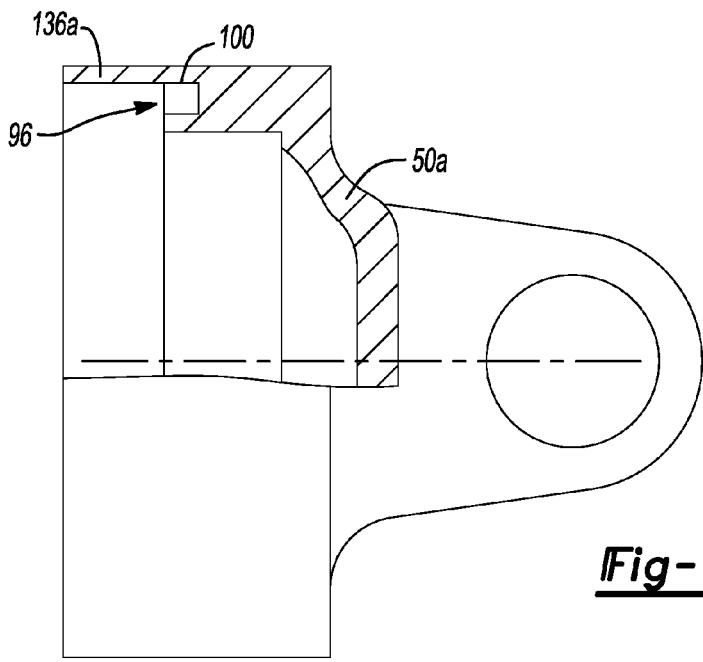
FIG. 7 is a view similar to that of FIG. 4 but illustrating yet another alternatively constructed first yoke.

If desired, a tool 136 can be employed during the friction welding process to limit the maximum diameter of the resulting weld (i.e., the tool 136 can function as a weld length control member). In the example provided, the tool 136 is configured to limit migration of the plasticized material of the first yoke body 50 in a radially outward direction by urging the plasticized material of the first yoke body 50 in an axial direction along the rotational axis 54 of the first yoke 40 to thereby extend a length of the resulting friction weld along the outer circumferential surface 140 of the propshaft tube 34. It should be appreciated, however, that the weld length control member 136a could be incorporated into the first yoke body 50a as shown in FIG. 7. In this example, the weld length control member 136a comprises an extension of the portion of the first yoke body 50a that defines the portion of the first yoke body 50a that defines the radially outer sidewall 100 of the annular groove 96.

Figure 8:
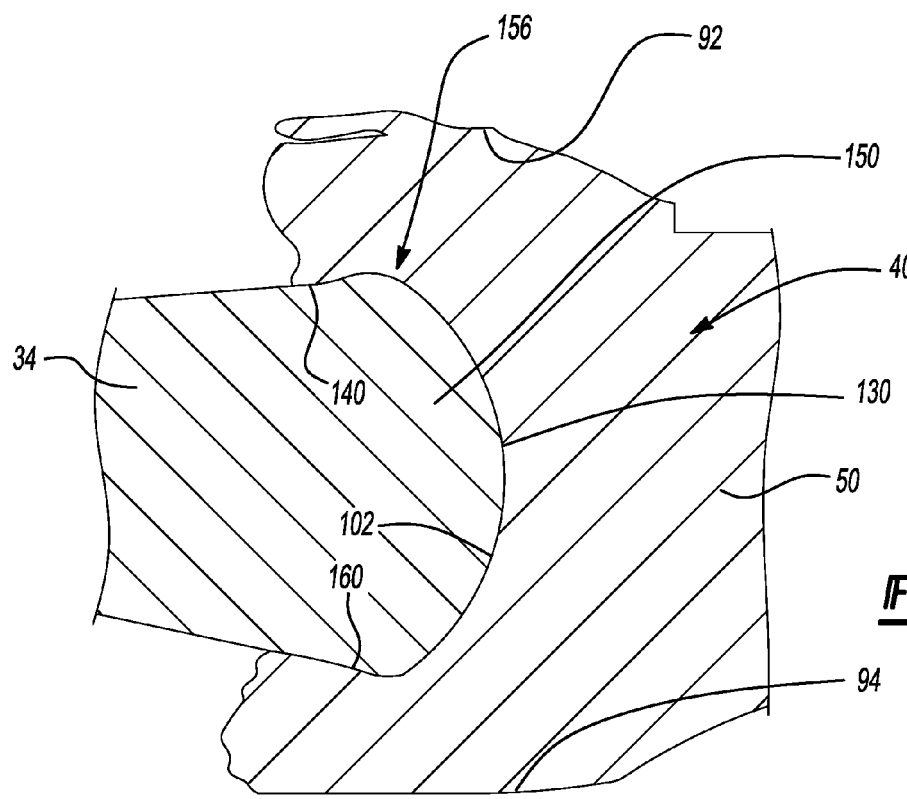
FIG. 8 is a section view of a portion of the propshaft assembly of FIG. 1 illustrating a weld zone that joins the first yoke to the propshaft tube.

In FIG. 8, a portion of the friction weld that fixedly couples the propshaft tube 34 to the first yoke 40 is illustrated. As shown, the propshaft tube 34 is welded to the first yoke body 50 such that a portion 150 of the propshaft tube 34 is disposed radially between the outer and inner circumferential surfaces 92 and 94 of the first yoke body 50 and the portion 150 of the propshaft tube 34 is embedded into an axial end of the first yoke body 50. In this regard, the friction weld defines a weld zone 156 having a radial component, in which the axial end face 130 of the propshaft tube 34 had abutted the end face 102 of the annular groove 96 in the first yoke body 50, as well as components that extend axially along the outer circumferential surface 140 and inner circumferential surface 160 of the propshaft tube 34. Configuration in this manner permits the weld zone 156 to be formed over a longer span as compared to the weld zone of a conventional friction weld, which would substantially conform to a cylindrical shape. Consequently, the weld zone 156 that is created with the present process can be significantly stronger than a conventional friction weld and can permit the wall thickness of the propshaft tube 34 to be decreased.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for forming a propshaft assembly, the method comprising:
    providing a propshaft tube having an annular wail member and an axial end face;
    providing a universal joint member having a first body including an annular wall that defines an outer circumferential surface, an inner circumferential surface and an annular groove disposed between the outer and the inner circumferential surfaces, wherein the annular groove has side walls and an end face, the side walls being spaced apart to receive the annular wall member;
    spinning at least one of the propshaft tube and the universal joint member while engaging the axial end face to the end face of the annular groove to plasticize a portion of the universal joint member and a portion of the propshaft tube; and
    driving the universal joint member and the propshaft tube together to fuse the plasticized portion of the universal joint member and the plasticized portion of the propshaft tube together and thereby form a friction weld;
    wherein the propshaft tube is fused to the universal joint member over portions of the universal joint member that correspond to the side walls and the end face.

2. The method of claim 1, wherein the universal joint member is a weld yoke having a pair of yoke arms that extend from the first body.

3. The method of claim 1, wherein prior to driving the universal joint member and the propshaft tube together, a weld length control member is positioned around a portion of the propshaft tube and a portion of the first body in a location where the friction weld is to be formed and wherein the weld length control member is configured to limit migration of plasticized material from the plasticized portion of the propshaft tube in a radially outward direction.

4. The method of claim 3, wherein the weld length control member is part of the universal joint member.

5. The method of claim 1, wherein the universal joint member comprises a first joint member portion and a second joint member portion, wherein the first joint member portion defines a bore into which the second joint member portion is fitted, wherein the second joint member portion is fixedly coupled to the first joint member portion, and wherein the second joint member portion at least partly defines the annular groove.

6. The method of claim 1, further comprising coupling a second universal joint member to the universal joint member to form a universal joint.

7. The method of claim 6, wherein the universal joint is a Cardan joint.

8. The method of claim 1, further comprising
    providing a second universal joint member having a second body that defines a second annular groove having second side walls and a second end face, the second side walls being spaced apart to receive the annular wall member of the propshaft tube;
    spinning at least one of the propshaft tube and the second universal joint member while engaging a second axial end face on the propshaft tube to the second end face of the second annular groove to plasticize a portion of the second universal joint member and a second portion of the propshaft tube; and
    driving the second universal joint member and the propshaft tube together to fuse the plasticized portion of the second universal joint member and the plasticized second portion of the propshaft tube together and thereby form a second friction weld;
    wherein the propshaft tube is fused to the second universal joint member over portions of the second universal joint member that correspond to the second side walls and the second end face.

9. The method of claim 8, wherein prior to driving the second universal joint member and the propshaft tube together, a weld length control member is positioned around a portion of the propshaft tube and a portion of the second body in a location where the second friction weld is to be formed and wherein the weld length control member is configured to limit migration of plasticized material from the plasticized second portion of the propshaft tube in a radially outward direction.

10. The method of claim 9, wherein the weld length control member is part of the second universal joint member.

11. The method of claim 8, wherein the second universal joint member comprises a first joint member portion and a second joint member portion, wherein the first joint member portion defines a bore into which the second joint member portion is fitted, wherein the second joint member portion is fixedly coupled to the first joint member portion, and wherein the second joint member portion at least partly defines the second annular groove.

12. The method of claim 8, further comprising coupling a third universal joint member to the second universal joint member to form a universal joint.

13. The method of claim 12, wherein the universal joint is a Cardan joint.

14. The method of claim 7, wherein the second universal joint member is a weld yoke having a pair of yoke arms that extend from the second body.

* * * * *

UNITED STATES PATENT AND TRADEMARK OFFICE
CERTIFICATE OF CORRECTION

PATENT NO. : 9,933,020 B2
APPLICATION NO. : 15/159119
DATED : April 3, 2018
INVENTOR(S) : Michael J. Leko It is certified that error appears in the above-identified patent and that said Letters Patent is hereby corrected as shown below:

In the Claims

Column 5, Line 3, Claim 1 delete "wail", insert --wall--, therefor.

Signed and Sealed this
Nineteenth Day of June, 2018

Andrei Iancu
*Director of the United States Patent and Trademark Office*